(12) United States Patent
Yokomizo et al.

(10) Patent No.: US 11,661,555 B2
(45) Date of Patent: May 30, 2023

(54) PROCESS AND APPARATUS FOR INTRODUCING CATALYST PRECURSOR INTO SLURRY HYDROCRACKING REACTOR

(71) Applicant: UOP LLC, Des Plaines, IL (US)

(72) Inventors: Grant H. Yokomizo, Nanuet, NY (US); Ping Sun, Hinsdale, IL (US); Mark Van Wees, Des Plaines, IL (US); Neeraj Tiwari, Gurgaon (IN); Syed Hassan Shah, Jersey City, NJ (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/499,670

(22) Filed: Oct. 12, 2021

(65) Prior Publication Data
US 2023/0110405 A1    Apr. 13, 2023

(51) Int. Cl.
*C10G 49/16* (2006.01)
*B01J 8/24* (2006.01)
*B01J 8/18* (2006.01)

(52) U.S. Cl.
CPC .......... *C10G 49/16* (2013.01); *B01J 8/1827* (2013.01); *B01J 8/24* (2013.01);
(Continued)

(58) Field of Classification Search
CPC .......... C10G 49/16; C10G 2300/1077; C10G 2300/4006; B01J 8/1827; B01J 8/24; B01J 2208/00017; B01J 2208/00752; B01J 2208/00787; B01J 2208/00823; B01J 2208/00902
See application file for complete search history.

(56) References Cited

U.S. PATENT DOCUMENTS

| 4,719,002 A * | 1/1988 | Mayer ............... C10G 49/12 208/112 |
| 10,195,588 B1 | 2/2019 | Do |

(Continued)

OTHER PUBLICATIONS

Search Report and Written Opinion for PCT/US2022/077750 dated Jan. 20, 2023.

*Primary Examiner* — Ellen M McAvoy
*Assistant Examiner* — Chantel L Graham
(74) *Attorney, Agent, or Firm* — Paschall & Associates, LLC; James C. Paschall

(57) ABSTRACT

A SHC apparatus and process comprise a catalyst precursor reactor for providing a catalyst precursor stream in downstream communication with a source of molybdenum, a SHC feed line for providing a heavy hydrocarbon feed stream in downstream communication with a heater, and a SHC reactor in downstream communication with the SHC feed line and with the catalyst precursor reactor. A process for SHC, the process comprising preparing a catalyst precursor stream comprising molybdenum in a catalyst precursor reactor, mixing the catalyst precursor stream with a heavy hydrocarbon stream to provide a catalyst precursor concentrate stream, heating a hydrocracking hydrocarbon feed stream in a heater to provide a heated hydrocracking feed stream, mixing the catalyst precursor concentrate stream with the heated hydrocarbon stream to provide a SHC feed stream, and reacting the SHC feed stream in a SHC reactor.

20 Claims, 3 Drawing Sheets

(52) U.S. Cl.
CPC .......... *B01J 2208/00017* (2013.01); *B01J 2208/00752* (2013.01); *B01J 2208/00787* (2013.01); *B01J 2208/00823* (2013.01); *B01J 2208/00902* (2013.01); *C10G 2300/1077* (2013.01); *C10G 2300/4006* (2013.01)

(56) References Cited

U.S. PATENT DOCUMENTS

| | | |
|---|---|---|
| 2015/0014216 A1 | 1/2015 | Sundararaman et al. |
| 2016/0068763 A1 | 3/2016 | Pham |
| 2018/0187100 A1 | 7/2018 | Koseoglu |
| 2020/0094239 A1* | 3/2020 | Do .................. B01J 37/08 |

\* cited by examiner

PROCESS AND APPARATUS FOR INTRODUCING CATALYST PRECURSOR INTO SLURRY HYDROCRACKING REACTOR

BACKGROUND

The field relates to a method and apparatus for treating crude oils and, more particularly, to the hydrocracking of heavy hydrocarbons in the presence of catalyst to provide useable products and further prepare feedstock for further refining.

A crude oil is typically separately in a distillation column to recover distillable products. The residue left in the distillation column contains the highest boiling point fraction of the crude, namely heavy oil, or residue oil. Heavier crude contributes to a higher yield in the heavy residue fraction. Heavy oils must be upgraded to produce useable products. In heavy oil upgrading, heavier materials are converted to lighter fractions and most of the sulfur, nitrogen and metals must be removed. Heavy oils contain a large portion of material boiling above 524° C. (975° F.). These heavy hydrocarbon feed stocks may be characterized by low reactivity in visbreaking, high coking tendency, poor susceptibility to hydrocracking and difficulties in distillation. Most residual oil feed stocks which are to be upgraded contain some level of asphaltenes which are typically understood to be heptane insoluble and toluene soluble compounds as determined by ASTM D3279 or ASTM D6560. Asphaltenes are high molecular weight aromatic compounds which may contain heteroatoms which impart polarity.

Heavy oil may be upgraded in a primary upgrading unit before it is further processed into useable products. Primary upgrading units known in the art include, but are not restricted to, coking processes, such as delayed or fluidized coking, and hydrogen addition processes such as fixed bed hydrotreating, ebullated bed or slurry hydrocracking (SHC).

In SHC, a three-phase mixture of heavy hydrocarbon feed cracks in the presence of gaseous hydrogen over solid catalyst to produce lighter products under pressure at an elevated temperature. In SHC, the primary objective is to convert the higher boiling fraction of crude to lower boiling intermediate products before secondary finishing. Resid conversion is frequently defined as the boiling off of a higher boiling mass fraction in the feed, such as boiling at and above 524° C. Usage of iron-based catalyst of a half a percent to a few percent relative to feed rate were found to provide around 80% conversion.

Molybdenum catalysts have a higher catalytic activity in comparison with iron catalysts. Because molybdenum catalyst has higher activity, less of it may be used making it more attractive catalyst than an iron-based catalyst.

Catalysts can be prepared by introducing a metal and a heteropoly acid into an oil feed. The feed is then heated to form an organometallic compound, which is then converted to a catalyst under hydrocracking conditions. The metal is described as an oxide, sulfide, or salt of a Group IV to VIII metal.

Molybdenum catalyst can be made of either oil-soluble molybdenum or a solid molybdenum. Molybdenum catalyst precursors or activated molybdenum catalyst may be carried by an oil feed. The purpose of an oil carrier is to provide a transportation medium and fully disperse a molybdenum catalyst whether activated or not. Molybdenum catalyst has affinity to hydrocarbon molecules. Thus, hydrocarbon molecules serve as a supporting matrix for a molybdenum catalyst to avoid forming a molybdenum clusters or aggregates. This is known as a key to dispersing molybdenum in hydrocarbon, so it is effective for SHC reactions. Typically, heavy residual feed, that is SHC feed, can be used to provide the carbon support. Examples of residual feed that have been used to provide carbon support include whole crude, atmospheric residue, vacuum residue, or a mixture of vacuum residue with a gas oil.

The most challenging for operating a slurry hydrocracking reactor of a residual feed is excessive coke or foulant formation. While coke and foulant deposits can be mechanically cleaned, mechanical cleaning requires shut down of plant processes and results in lost profits. Control of coke or foulant formation to a manageable level is critical through effective catalytical hydrogeneration.

The SHC product can be characterized by solids that are insoluble in toluene solvent. The solids not dissolved by toluene include residual catalyst or inorganic metal species and toluene insoluble organic residue (TIOR). TIOR is an approximate measure of a degree of coke and foulant formation. When a catalyst performs well, it maintains TIOR at a low stable level that sustains the operation.

Accordingly, this disclosure teaches a process and apparatus that reduces coke and foulant formation, e.g., in the heat exchange and heater, during the SHC process.

SUMMARY

The present disclosure provides a process and apparatus for introducing a catalyst precursor-rich stream into a SHC reactor. The process avoids fouling during the transportation of catalyst in the hydrocarbon and prevents coke and foulant formation during a SHC process.

In one aspect of the present disclosure, a SHC apparatus comprises a catalyst preparation system for providing a catalyst precursor stream in downstream communication with a source of molybdenum, a SHC feed line for providing a heavy hydrocarbon feed stream in downstream communication with a heater, and a SHC reactor in downstream communication with the SHC feed line and with the catalyst precursor reactor.

In an aspect of the present disclosure, a SHC apparatus can comprise a catalyst reactor for providing a catalyst precursor stream that can be in downstream communication with a water source and a source of molybdenum for producing a catalyst precursor stream, a mixing vessel can be in downstream communication with said catalyst reactor and a source of heavy hydrocarbon for mixing said catalyst precursor stream with a heavy hydrocarbon stream may provide a catalyst precursor concentrate stream, a drying section can be downstream communication with the mixing vessel for drying the catalyst precursor concentrate stream may provide a dried precursor concentrate stream, a SHC section can comprise a heater and a SHC reactor, and a dried precursor line can be in downstream communication with the drying section and a catalyst precursor concentrate line can be in downstream communication with said dried precursor line and adjoining the slurry hydrocracking section at a slurry hydrocracking feed line downstream of said heater and upstream of said slurry hydrocracking reactor. A sulfur containing chemical is not used in catalyst precursor preparation or in catalyst precursor injection system. The only source of sulfur necessary is naturally provided organosulfur originated in the feedstock.

In an aspect of the present disclosure, a process for SHC can comprise preparing a catalyst precursor stream comprising molybdenum in a catalyst precursor reactor with no sulfiding agent added, mixing the catalyst precursor stream with a heavy hydrocarbon stream to provide a catalyst precursor concentrate stream, heating a hydrocracking hydrocarbon feed stream in a heater to provide a heated hydrocracking feed stream, mixing the catalyst precursor concentrate stream with the heated hydrocracking hydrocarbon stream to provide a SHC feed stream, and reacting the SHC feed stream in a SHC reactor.

Those skilled in the art will further appreciate the above-mentioned advantages and superior features of the invention together with other important aspects thereof as claimed by reading the detailed description which follows in conjunction with the drawings.

DEFINITIONS AND EXPLANATIONS

Figure 1:
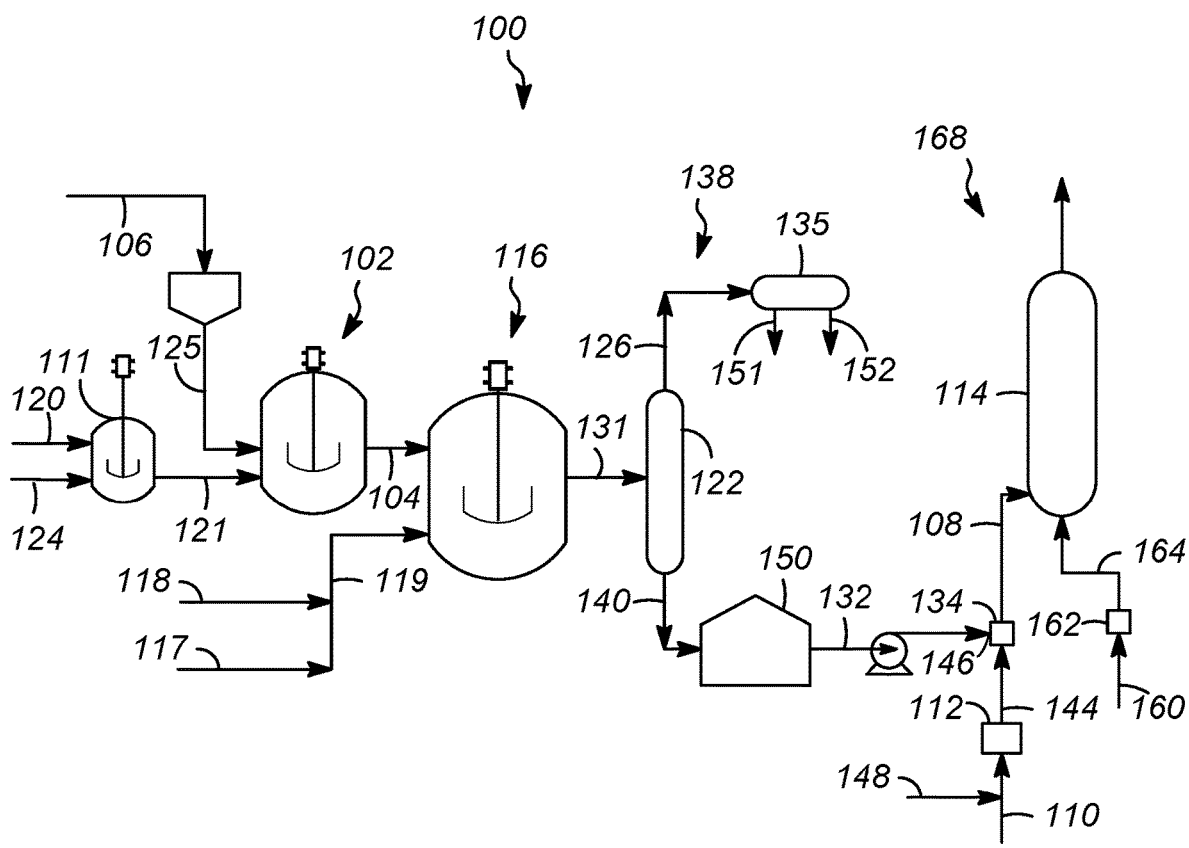
FIG. 1 is a schematic flow scheme for at least one embodiment of a SHC process and apparatus in accordance with the principles in the present disclosure.

The term "communication" means that fluid flow is operatively permitted between enumerated components, which may be characterized as "fluid communication". The term "communication" may also mean that data or signals are transmitted between enumerated components which may be characterized as "informational communication".

The term "downstream communication" means that at least a portion of the fluid flowing from the subject in downstream communication may operatively flow to the object with which it fluidly communicates.

The term "upstream communication" means that at least a portion of fluid flowing to the subject in upstream communication may operatively flow from the object with which it fluidly communicates.

The term "direct communication" means that fluid flow from the upstream component enters the downstream component without passing through any other intervening vessel.

The term "indirect communication" means that fluid flow from the upstream component enters the downstream component after passing through an intervening vessel.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripping columns omit a reboiler at a bottom of the column and instead provide heating requirements and separation impetus from a fluidized inert media such as steam. Stripping columns typically feed a top tray and take main product from the bottom.

As used herein, the term "boiling point temperature" means atmospheric equivalent boiling point (AEBP) as calculated from the observed boiling temperature and the distillation pressure, as calculated using the equations furnished in ASTM D1160 Annex A7 entitled "Practice for Converting Observed Vapor Temperatures to Atmospheric Equivalent Temperatures".

As used herein the term "foulant" means unwanted material accumulating on solid surfaces to the detriment of the function of the unit comprising the solid surfaces.

As used herein the term "indirect heating" means heating a material to a desired temperature not using a heater.

As used herein, the term "True Boiling Point" (TBP) means a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, "pitch" means the hydrocarbon material boiling above about 524° C. (975° F.) AEBP as determined by any standard gas chromatographic simulated distillation method such as ASTM D2887, D6352 or D7169, all of which are used by the petroleum industry.

As used herein, the term "T5" or "T95" means the temperature at which 5 vol % or 95 vol %, as the case may be, respectively, of the sample boils using ASTM D7169, ASTM D86 or TBP, as the case may be.

As used herein, the term "initial boiling point" (IBP) means the temperature at which the sample begins to boil using ASTM D7169, ASTM D86 or TBP, as the case may be.

As used herein, the term "end point" (EP) means the temperature at which the sample has all boiled off using ASTM D7169, ASTM D86 or TBP, as the case may be.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.) using the TBP distillation method.

As used herein, "pitch conversion" means the conversion of materials boiling above 525° C. (977° F.) converting to material boiling at or below 525° C. (977° F.).

As used herein, "preforming" means the catalyst activation step in the process.

As used herein, "vacuum gas oil" means a hydrocarbon material having an IBP of at least about 260° C. (500° C.), a T5 of between about 288° C. (550° F.) and about 392° C. (700° F.), typically no more than about 343° C. (650° F.).

As used herein, "heavy vacuum gas oil" means the hydrocarbon material having a T5 between about 359° C. (750° F.) and about 450° C. (842° F.) and a T95 between about 510° C. (950° F.) and about 570° C. (1058° F.), or an EP of no more than about 626° C. (1158° F.) prepared by vacuum fractionation of atmospheric residuum as determined by any standard gas chromatographic simulated distillation method such as ASTM D2887, D6352 or D7169, all of which are used by the petroleum industry.

As used herein, "atmospheric residuum" means the hydrocarbon material boiling with an IBP of at least about 287° C. (550° F.), a T5 of between about 343° C. (650° F.) and about 524° C. (975° F.), typically no more than about 450° C. (842° F.), and a T95 of at least about 510° C. (950° F.).

As used herein, "vacuum residuum" means the hydrocarbon material boiling with an IBP of at least 500° C. (932° F.).

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, solvent "insolubles" means materials not dissolving in the solvent named.

The term "$C_x$" are to be understood to refer to molecules having the number of carbon atoms represented by the subscript "x". Similarly, the term "$C_x-$" refers to molecules that contain less than or equal to x and preferably x and less carbon atoms. The term "$C_x+$" refers to molecules with more than or equal to x and preferably x and more carbon atoms.

The following detailed embodiments presented herein are for illustrative purposes. That is, these detailed embodiments are intended to be exemplary of the present invention for the purposes of providing and aiding a person skilled in the pertinent art to readily understand how to make and use of the present invention.

Accordingly, the detailed discussion herein of one or more embodiments is not intended, nor is it to be construed, to limit the boundaries of the descriptions but rather as defined by the claims and equivalents thereof. Therefore, embodiments not specifically addressed herein, such as adaptations, variations, modifications, and equivalent arrangements, should be and are considered to be implicitly disclosed by the illustrative embodiments and claims set forth herein and therefore fall within the scope of the present disclosure.

Further, it should be understood that, although steps of various claimed methods may be shown and described as being in a sequence or temporal order, the steps of any such method are not limited to being carried out in any particular sequence or order, absent an indication otherwise. That is, the claimed method steps are considered capable of being carried out in any sequential combination or permutation order while still falling within the scope of the present invention.

Additionally, it is important to note that each term used herein refers to that which a person skilled in the relevant art would understand such term to mean, based on the contextual use of such term herein. To the extent that the meaning of a term used herein, as understood by the person skilled in the relevant art based on the contextual use of such term, differs in any way from any particular dictionary definition of such term, it is intended that the meaning of the term as understood by the person skilled in the relevant art should prevail.

Furthermore, a person skilled in the art of reading claimed inventions should understand that "a" and "an" each generally denotes "at least one," but does not exclude a plurality unless the contextual use dictates otherwise. Also, the term "or" denotes "at least one of the items," but does not exclude a plurality of items of the list.

In the description which follows, like parts are marked throughout the specification and drawings with the same reference numerals, respectively. The drawing figures may not necessarily be to scale and certain features may be shown in somewhat schematic form in the interest of clarity and conciseness.

DESCRIPTION OF THE PREFERRED EMBODIMENTS

A SHC catalyst is intended to reduce coke formation or fouling while a residue feedstock is being converted to lower boiling, upgradable, thus more valuable hydrocarbon product. The mechanism of coke formation or fouling of a resid feedstock being converted in a SHC reactor, an ebulliated reactor, a fixed bed hydroprocessing or a fluidized or delayed coking reactor has been a popular subject in many research studies, often involving polymerizations and dehydrogenative condensations associated with complex intermediate reaction steps within a free radical cracking chain reaction network. A SHC catalyst is well recognized as necessary in its role in shuttling protons as a means of radical stabilizer, frequently relying on gaseous hydrogen solubilized in liquid to sustain a stable operation when the residue feedstock is converted at desired pitch conversion levels. A residue feedstock commonly contains majority of its mass fraction in the boiling 525° C. and above. The effectiveness of a primary cracking process typically aims at a mass conversion of 40% or above, preferably greater than 70%, and more preferably 90% or higher.

A point of reference of achievable conversion when no catalyst is used is a delayed coker. Solid coke is the dominant product due to the non-hydrogen environment in delayed coking. In delayed coking, high coke yield and conversion is as low as 40 to 50% by weight is common. When a catalyst and a hydrogen environment are used achievable conversion is significantly increased to 60 to 90% by weight or higher with a drastically reduced coke yield.

A SHC catalyst commonly utilizes a metal containing compound. A precursor of metal originates from a wide range of groups from the periodic table, such as from Group II, III, IV, V VIB, VIIB and VIII of the periodic table. Molybdenum, tungsten, chromium, vanadium, cobalt, titanium, iron, nickel and their mixtures were found useful in reducing coke formation. The metal precursors originate as a range of compounds, such as a sulfate, an oxide or a carbonate. In order to be utilized in a SHC reactor, metals may be added as a water solution or an oil solution. Almost exclusively all the metal element in the catalyst precursors eventually need to be converted to a sulfide to actively function as an activated catalyst. The activations are through a sulfidation reaction of a catalyst precursor by contacting the metal with a sulfidation agent at a temperature-activated condition to catalyze the reaction at a reasonably fast rate. A sulfidation agent is necessarily a sulfur-containing compound, however not every sulfur-containing compound is sufficiently able to sulfide a metal catalyst precursor. A complex science is involved in the art of sulfiding a metal catalyst.

Molybdenum is by far the most frequently used catalyst precursor metal in hydroprocessing. In this disclosure, the use of a molybdenum-based catalyst is exemplified but not required.

Molybdenum may be introduced into a catalyst preparation in either an aqueous form or an oil soluble form. Naturally occurring molybdenum compounds such as an oxide and ammonium molybdates are soluble in water or an aqueous acid. Oil soluble molybdenum compounds also exist, such as a naphthenate or octoate, but require different carriers and involve different process steps due to differences in the carrier. However, once introduced into a SHC process, the working mechanism is similar. In this disclosure we illustrate the process using a molybdenum trioxide as catalyst precursor for an example.

When molybdenum trioxide is used as a catalyst precursor, it is introduced through an aqueous carrier, such as an acid stream. Molybdenum trioxide transforms in an aqueous solution. A stream of oil may be added with the objective of homogenizing the molybdenum precursor to maintain its dispersibility during the entire course of its preparation, injection and reaction.

Process steps and conditions may be designed to maintain high catalyst performance. Catalyst performance and, frequently, catalyst activity refer to the effectiveness of a catalyst in achieving the objective of reducing coke formation. Frequently, a relatively low concentration of metals provided at a given feed rate that achieves the same conversion and coke yield as another metal provided at a higher concentration is an indication of higher catalyst activity. Catalyst activity can be effected by the dispersibility of an activated catalyst compound, poisons in the feedstock, or a specific condition that may deactivate a catalyst or stifle the effectiveness of a catalyst.

Molybdenum sulfides are widely known to be active when in contact with a reacting hydrocarbon feedstock in an environment of hydrogen or hydrogen sulfide. Molybdenum sulfides are necessary to catalyze hydrogenation reactions. But not all types of molybdenum sulfides are sufficiently active to catalyze hydrogenation reactions. Molybdenum is very versatile in terms of its oxidation states among a range of sulfide species. Molybdenum disulfides are believed to be the most active catalyst; trisulfides, however, are frequently believed as a necessary intermediate for transforming from an oxide-molybdenum bond to a sulfide-molybdenum bond.

In the case of SHC, effective sulfiding agents include elemental sulfur, hydrogen sulfide or a liquid sulfide that is readily decomposed to hydrogen sulfide upon heating, such as, dimethyl disulfide.

Injecting a catalyst into a feed stream may be subject to a failure mode related to catalyst fouling under elevated temperature during its transportation. To gain knowledge of the failure mode and its underlying root cause requires studies at commercial scale operation or experimental set-up that is designed to closely mimic commercial scale operation. Many batch scale catalyst formulations and their subsequent activity studies fail to include an evaluation of a catalyst transformation during transport into a reactor. Conditions that avoid catalyst fouling and an apparatus therefor are directly relevant to an industrial scale.

A residue feed in a refinery is typically preheated to a temperature close to an SHC reaction temperature. The preheating device may be a fired heater by burning a gaseous fuel or a heat exchanger with a miscellaneous heat source. During heating, a residue feed may thermally decompose cleaving carbon-carbon bonds and carbon-sulfur bonds to produce smaller molecules rich in unpaired electrons or free radicals. The high reactivity of radicals may lead to cross linking to form stable molecules a pathway known as polymerization that leads to coke formation. Hydrogen gas may be co-fed with the liquid resid feed when passing through a heater. Hydrogen gas greatly stabilizes any radicals formed, thus preventing coke formation. Sulfides that decompose due to thermal effect release sulfur radicals that may mostly convert to hydrogen disulfides in a gas state. Hydrogen disulfides are frequently a sulfiding agent for a metal catalyst. When a molybdenum-based catalyst is cofed in an oxidized form with a resid feedstock, it converts to a molybdenum sulfide in presence of hydrogen sulfides. The form and extent of molybdenum sulfide formation is a complex function of its oxidation states, temperature and hydrogen pressure. Many literature references have provided analytical insights into the chemistry. However, laboratory studies rarely find or disclose when molybdenum oxide converts to a sulfide and its aggregate growth in size. When a concentrated molybdenum is used and converts to disulfides, the system runs the risk of fouling which can plug the line and interrupt the process making it inoperable.

Many catalyst preparations include a sulfidation step. The objective is to activate a catalyst precursor metal to a metal sulfide before co-feeding it with a residue feed. Metal sulfide is the ultimate catalyst form that is catalytically active in the reactor. The sulfiding step may also be known as preforming. In case of molybdenum, a molybdenum source may be a molybdenum oxide or an ammonium molybdate with a varying number of hydrates. Frequently a sulfiding agent is a gaseous hydrogen sulfide, an elemental sulfur, or a low molecule sulfide such as dimethyl sulfide. Sulfidation relies on elevated temperatures. In catalyst preparation, a catalyst precursor typically has a high concentration. Fouling can occur to a high extent due to the use of a high concentration of the catalyst precursor. A laboratory that aims at studying the effectiveness of a catalyst recipe may fail unless care is taken to address the risk of fouling.

A process and apparatus are disclosed that minimizes risks of fouling in the employment of a catalyst precursor. The molybdenum example provided and may be applied to a range of different molybdenum precursors or other metal precursors.

High temperature is required to activate or preform a hydrocarbon dispersed metal catalyst such as about 260° C. (500° F.) to about 387° C. (700° F.). However, low pressure may be employed in preforming such as about 345 kPa (50 psig) to about 1.4 MPa (200 psig). Higher pressure activation may be acceptable as well. Molybdenum precursor sulfidation is the subject of scientific research. In the case of a phosphomolybdic acid precursor, achieving full activation involves conversion to a molybdenum trisulfide intermediate at a low temperature condition followed by a quick conversion to molybdenum disulfide at elevated temperature while a sulfiding environment persists.

During preforming, a hydrocarbon dispersed metal catalyst, or more specifically, a phosphomolybdic acid precursor dispersed in a hydrocarbon matrix may result in polymerization and further chemically interaction with asphaltenes in a solid carbonaceous foulant. The solid carbonaceous foulant can rapidly form on hot surfaces when the metal catalyst is directly heated to preforming temperatures to transform it to a sulfide. The heavy resid hydrocarbon is key to disperse the metal catalyst. However, it increases the propensity for foulant formation The foulant behaves as a separate liquid or semi-solid phase in the catalyst-hydrocarbon mixture, and, once formed, eventually deposits in transfer lines.

At commercial scale, or during the scale-up of a pilot plant, foulant deposits build on hot equipment surfaces, thereby insulating the hot equipment surfaces and reducing the heat transfer rate capabilities of the equipment. The process equipment, such as a heater or furnace, or any process equipment that operates at an elevated temperature will become so insulated by the foulant deposits that they may fail to reach the target temperature.

This disclosure aims to avoid the preforming or preactivation step in the catalyst preparation before the catalyst precursor reaches the SHC reactor.

Turning to FIG. 1, an exemplary embodiment of a SHC process and apparatus 100 utilizing a catalyst precursor reactor 102 for providing a catalyst precursor stream 104 in downstream communication with a source of catalytic metal such as molybdenum in line 106. A SHC feed line 108 providing a heavy hydrocarbon feed stream from line 110 can be in downstream communication with a heater 112. A SHC reactor 114 can be in downstream communication with the SHC feed line 108 and with the catalyst precursor reactor 102.

The process is capable of processing a wide range of residual hydrocarbon feedstocks such as a heavy hydrocarbons stream in line 110. It can process aromatic feedstocks, as well as feedstocks which have traditionally been very difficult to hydroprocess; e.g., atmospheric or vacuum residuum, visbroken residue, deasphalted bottom materials, off-specification asphalt, sediment from the bottom of oil storage tanks, tar sands, bitumen, etc. Preferred feeds include atmospheric residuum and preferably, vacuum residuum. Suitable feeds include an API gravity of no more than 20 degrees, typically no more than 10 degrees and may include feeds with less than 5 degrees.

The catalyst prepared in the catalyst precursor reactor 102 may comprise a metal. Molybdenum is the preferred metal and may be provided to the catalyst precursor stream in line 104 from a source of molybdenum in line 106. The catalyst may be provided as molybdenum dispersed in a hydrocarbon matrix also known as a hydrocarbon dispersed molybdenum. The hydrocarbon dispersed molybdenum can be prepared by first mixing or otherwise introducing a molybdenum catalyst precursor into a heavy hydrocarbon liquid, drying it of water, if necessary, if the molybdenum catalyst precursor is in an aqueous form, to provide a catalyst precursor stream in line 104. The source of molybdenum may also be an oil-based molybdenum, such as molyoctoate which will not need drying after mixing with the heavy hydrocarbon liquid.

A molybdenum compound may be converted or processed into a molybdenum catalyst precursor. The source of molybdenum in line 106 can provide molybdenum for the catalyst precursor reactor 102. The molybdenum may be molybdenum trioxide which can be fed to a hopper and transferred to a reactor 102 in line 125. The molybdenum trioxide may be augered into line 125.

It is preferred that the molybdenum catalyst precursor be a polyacid of molybdenum. Preferred polyacids are those selected from the group consisting of heteropolyacids, such as the polyacids of molybdenum, preferably phosphomolybdic acid and molybdosilicic acid. Most preferred is phosphomolybdic acid. The term "phosphomolybdic acid" as used herein may include or designate aqueous solutions of the reaction product of $MoO_3$ with dilute phosphoric acid in which the phosphorus to molybdenum atomic ratio ranges from about 0.083 to about 2, preferably from about 0.083 to about 1 and most preferably from about 0.083 to about 0.5. A molybdenum catalyst precursor solution can contain one or more phosphomolybdic acid species such as the 12-molybdophosphoric acid and the dimeric 18-molybdophosphoric acid. Moreover, the crystalline 12- and 18-molybdophosphoric acids can be used to prepare the aqueous solutions of phosphomolybdic acid used herein. If such crystalline phosphomolybdic acids are used, additional phosphoric acid or other phosphorus compounds may be added to the solution to provide the desired phosphorous-to-molybdenum ratio. The phosphomolybdic acid solution should have a molybdenum concentration of about 1 to about 20 wt %, suitably no more than about 10 wt % and preferably between about 2 and about 5 wt %.

The SHC process and apparatus 100 may be in downstream communication with a source of phosphorous in line 124. The source of phosphorous may be phosphoric acid. The catalyst precursor reactor 102 may also be in downstream communication with the source of phosphorous in line 124. The catalyst precursor reactor 102 can be in downstream communication with a source of water in line 120, such as deionized water. Additional water may not be necessary if the phosphorous source is sufficiently dilute in water. The source of phosphorous in line 124 may feed phosphoric acid to a stirred tank 111. The source of water in line 120 may also feed the stirred tank 111 to provide diluted aqueous phosphoric acid from the stirred tank in line 121. The stirred tank 111 may feed aqueous phosphorous in line 121 into the reactor 102 along with molybdenum trioxide in line 125.

In an embodiment of the present disclosure, the SHC apparatus 100 can comprise a catalyst precursor reactor 102 for providing a catalyst precursor stream in line 104 in downstream communication with a source of water 120 and a source of metal in line 106 for producing a catalyst precursor stream in line 104. The catalyst precursor reactor 102 can further comprise a stirred reactor. The catalyst precursor reactor 102 can receive the molybdenum trioxide and the diluted phosphoric acid which may be pumped into the stirred catalyst precursor reactor 102. The catalyst precursor stream in line 104 may be fed to a precursor concentrate mixer 116. Conditions in the stirred catalyst precursor reactor 102 include a temperature range of 20° C. to 150° C. with pressure of atmospheric to 689 kPa (g) (100 psig).

A heavy hydrocarbon source comprising a heavy hydrocarbon stream in line 119 should be highly asphaltenic and may comprise a highly dealkylated liquid to ensure dispersion of asphaltenes in the hydrocarbon liquid. Sufficient dealkylation may be characterized by the heavy hydrocarbon stream in line 119 comprising no more than 11.3 wt %, suitably no more than 11.2 wt % and preferably no more than 11.1 wt % hydrogen and having at least 7 wt %, suitably at least 8 wt % and preferably at least 9 wt % hydrogen. Hydrogen concentration may be determined by nuclear magnetic resonance. The heavy hydrocarbon stream in line 119 should have sufficient asphaltenes to support the catalytic metal. Sufficient asphaltenes are quantified by at least 3 wt % microcarbon residue, suitably at least 3.1 wt % microcarbon residue, more suitably at least 4 wt % microcarbon residue and preferably at least 7 wt % microcarbon residue using ASTM D4530. The heavy hydrocarbon liquid may have no more than 50 wt % and suitably no more than 30 wt % microcarbon residue. The heavy hydrocarbon stream in line 119 may be provided by a heavy vacuum gas oil, which may be previously slurry hydrocracked, stream in line 118 mixed with a vacuum resid stream in line 117. The vacuum resid stream in line 117 and the heavy hydrocarbon stream in line 110 may come from the same source.

The molybdenum catalyst precursor may be water soluble. A molybdenum catalyst precursor solution may be mixed with the heavy hydrocarbon liquid. The heavy hydrocarbon stream in line 119 may be mixed with the catalyst precursor stream in line 104 to provide a catalyst precursor concentrate stream in a catalyst precursor concentrate line 132.

The SHC apparatus 100 may comprise at least one precursor concentrate mixer 116 in downstream communication with the catalyst precursor reactor 102 and the heavy hydrocarbon source in line 119. The SHC feed line 108 can be in downstream communication with the at least one precursor concentrate mixer 116.

A sufficient amount of the aqueous phosphomolybdic acid solution in line 104 is mixed with the dealkylated aromatic liquid and the asphaltenic liquid in the heavy hydrocarbon stream in line 119 to provide from about 0.05 to about 3 wt %, suitably from about 0.1 to about 2 wt %, and preferably from about 0.2 to about 1 wt % molybdenum, calculated as elemental molybdenum based on the heavy hydrocarbon stream from line 119 in the mixed catalyst precursor concentrate stream in line 131. Mixing conditions should be about 66 to about 135° C. and about 200 to about 1000 kPa. The resulting mixed catalyst precursor concentrate stream in line 131 can be a water-containing molybdenum catalyst precursor mixture; i.e., a wet molybdenum catalyst precursor concentrate. High shear mixing is an example of a suitable method for mixing an aqueous solution of the molybdenum catalyst precursor in the heavy hydrocarbon stream from line 119. Mixing should be effected at a temperature and pressure to prevent the aqueous solution from boiling off. In an aspect, the dealkylated aromatic liquid comprises about 10 to about 70 wt % of the catalyst precursor concentrate stream in line 132.

If the catalyst is in an aqueous form, a drying section 138 may be in downstream communication with the catalyst precursor reactor 102 and the precursor concentrate mixer 116 for drying the mixed catalyst precursor concentrate stream in line 131 to provide a dried precursor concentrate stream in a dried precursor concentrate line 140. If the molybdenum is processed in an aqueous form, such as phosphomolybdic acid, the SHC apparatus 100 can comprise a water flash column 122 in downstream communication with the precursor concentrate mixer 116. The drying section 138 can be utilized to dry the mixed catalyst precursor concentrate stream and provide the dried precursor concentrate stream in the dried precursor concentrate line 140. Due to the difference in boiling point between water and the heavy hydrocarbon stream in line 119, the water from the mixed catalyst precursor concentrate stream can be removed after mixing during a drying or dehydration step by heating to a drying temperature, such as about 120 to about 180° C. and flashing it at a pressure of about 35 to about 276 kPa to provide a dried catalyst precursor concentrate.

The drying section 138 can comprise a water flash column 122 which after heating, flashes off the water as a vapor, in the column. The vapor in a drier overhead line 126 may be completely condensed and collected in an oil/water separator 135. Water is collected in line 151 which may be recycled, and hydrocarbon is collected in line 152 which may be fed to the SHC reactor 114. A drier bottoms line 140 extending from a bottom of the water flash column 122 may transport dried precursor concentrate from the drying section 138 to a catalyst precursor concentrate tank 150.

If the molybdenum is provided in an oil soluble form, the drying section 138 may be omitted, and the catalyst precursor concentrate stream in line 131 may feed the precursor concentrate tank 150 directly.

The catalyst precursor concentrate stream may leave the precursor concentrate tank 150 in the catalyst precursor concentrate line 132 via a high-pressure precursor concentrate pump. It is contemplated that the tank 150 may be omitted and the drier bottoms line 140 serve as the catalyst precursor concentrate line 132. The catalyst precursor concentrate line 132 can be adjoined to the SHC feed line 108 and directly inject the catalyst precursor concentrate stream 132 into the heated hydrocarbon feed stream in line 144 to provide the SHC feed stream in line 108.

The SHC apparatus and process 100 can comprise a SHC reactor section 168 that includes the SHC reactor 114. The catalyst precursor concentrate line 132 can be in downstream communication with the drying section 138 and adjoin the SHC feed line 108 downstream of a heater 112 and upstream of an SHC reactor 114. The SHC feed line 108 may be in downstream communication with the catalyst precursor reactor 102 at an inlet 146 that is in downstream communication with the heater 112 and in upstream communication with the SHC reactor 114. The catalyst precursor concentrate stream in the catalyst precursor concentrate line 132 can be distributed into the heavy hydrocarbon feed stream in the SHC feed line 108 downstream of the heater 112 and upstream of the SHC reactor 114. The catalyst precursor concentrate stream in the catalyst precursor concentrate line 132 can be distributed into the heavy hydrocarbon feed stream in the SHC feed line 108 downstream of the heater 112. Distribution may be effected via a distributor 134 comprising a quill injector. The distributor 134 may inject the catalyst precursor concentrate stream in line 132 preferably in an upstream direction into the heavy hydrocarbon feed stream flowing downstream in the SHC feed line 108 to the SHC reactor 114. The SHC feed line 108 may be in downstream communication with the bottoms line 140 of a water flash column 122 in the drying section 138.

A process for SHC can comprise preparing a catalyst precursor stream 104 comprising a catalyst metal such as molybdenum provided by the source of molybdenum in line 106 in upstream communication with a catalyst precursor reactor 102. The catalyst precursor stream in line 104 can be mixed with a heavy hydrocarbon sourced in line 119 to provide a dried precursor concentrate stream in line 140 or line 132. A heavy hydrocarbon feed stream 110 can be heated in a heater 112 to provide a heated hydrocracking feed stream and the catalyst precursor concentrate stream in line 132 may be mixed with the heated hydrocarbon feed stream in line 144 to provide a SHC feed stream in the SHC feed line 108. The SHC feed stream is reacted in the presence of the catalyst provided in the catalyst precursor concentrate stream in the SHC reactor 114. The source of molybdenum in line 106 can be an aqueous solution of a molybdenum compound and the water in the aqueous solution can be flashed off to dry the catalyst precursor stream 104 to create the catalyst precursor concentrate stream in line 132 and/or the dried precursor concentrate stream in line 140.

A catalyst precursor concentrate line 132 can provide the catalyst precursor concentrate stream to the SHC feed line 108, which can be in downstream communication with the catalyst precursor concentrate catalyst line 132.

A quill injector 134 can connect the catalyst precursor concentrate line 132 to the SHC feed line 108 and inject the catalyst precursor concentrate stream in line 132 into the heavy hydrocarbon feed stream in line 110.

The heavy hydrocarbon feed stream in line 110 can be mixed with a hydrogen gas stream in line 148 upstream of the heater 112. The heater 112 may be a fired heater. We have found that the molybdenum in the catalyst precursor concentrate stream in line 132 can convert to molybdenum sulfide to become active catalyst within 1-3 seconds of entry into the SHC reactor 114 when the temperature in the SHC reactor 114 is at and preferably greater than 720° F. The heavy hydrocarbon feed stream should be heated to a temperature of no more than about 695° F., suitably no more than 690° F. and preferably no more than 680° F. to avoid appreciable conversion of a molybdenum precursor into a molybdenum disulfide in the SHC feed line 108 upstream of the SHC reactor 114. Consequently, when the catalyst precursor concentrate stream in line 132 is mixed with the heated hydrocarbon feed stream in line 144, the resulting SHC feed stream in the SHC feed line 108 will be at a temperature of about 260° C. (500° F.) to about 387° C. (700° F.). In this temperature range and residence time, fouling will not occur in the SHC feed line 108. However, the heavy hydrocarbon feed line has to be heated to SHC reaction temperature in order for the SHC reaction to occur in the SHC reactor 114. The liquid hydrocarbon feed stream in the heater 112 may observe a peak temperature range of about 260° C. (500° F.) to about 454° C. (850° F.). Hence, hydrogen in the reactor hydrogen line 160 is heated in a heater 162 to sufficient temperature in a hydrogen reactor feed line 164 to raise the reactor 114 to SHC reaction temperature of greater than 700 to about 900° F., suitably at least 710° F. and preferably at least 720° F., upon entry into the reactor 114. By injecting the catalyst precursor concentrate in the line 144 at a location that is cooler than the feed heater 112, fouling in the line is avoided. By keeping the SHC feed stream in line 108 below reaction temperature, fouling in the line 108 is avoided. The SHC feed stream in line 108 can comprise about 250 to about 2000 wppm molybdenum.

Generally, a catalyst, such as a catalyst comprising molybdenum, can be activated in the catalyst precursor reactor 102. The catalyst precursor reactor 102 can be in communication with a source of phosphorous 124. As an example, though this disclosure is not intended to be limited by this example, the source of phosphorous 124 can be pumped to a stirred reactor 102. Molybdenum can be added as an ingredient in the catalyst composition if desired. The SHC apparatus 100 can comprise lines, pipes, pumps, heaters, and other process equipment necessary to form a SHC apparatus.

Like the other sections described herein, many mixing and pumping arrangements may be suitable for the equipment of the SHC apparatus 100. It is also contemplated that more than one heavy hydrocarbon feed stream may be added separately to the catalyst precursor reactor 102. Additional hydrogen may be fed into the SHC reactor 114 after undergoing heating. Both the heavy hydrocarbon feed stream and hydrogen may be distributed to the SHC reactor 114 with an appropriate distributor. The feed stream entering the SHC reactor 114 can comprise the catalyst precursor concentrate stream 132, the SHC feed stream in line 108, and gaseous hydrogen from line 164.

The slurry hydrocracking process can be operated at quite moderate pressure, in the range of 3.5 MPa (g) (500 psig) to 24 MPa (g) (3500 psig) and preferably in the range of 10.3 MPa (g) (1500 psig) to 19.3 MPa (g) (2800 psig). The LHSV is typically below about 4 hr$^{-1}$ on a fresh feed basis, with a range of about 0.1 to 3 hr$^{-1}$ being preferred and a range of about 0.3 to 1 hr$^{-1}$ being particularly preferred.

Figure 2:
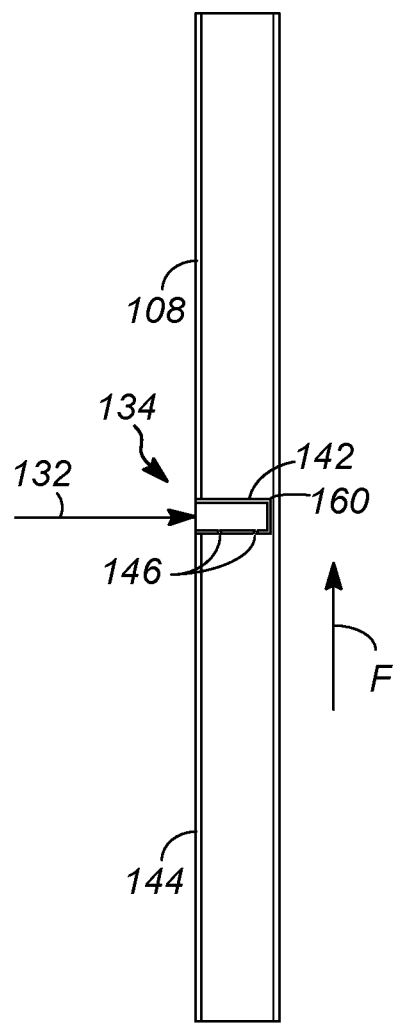
FIG. 2 is an enlarged view of at least one embodiment of the process and apparatus of FIG. 1 in accordance with the principles of the present disclosure.

Turning to FIG. 2, a close-up of an exemplary embodiment of the distributor 134 is shown. The distributor 134 may comprise a quill injector 142 comprising a pipe having two outlets 146 comprising nozzles directed upstream of the flow F of the heated hydrocarbon feed stream flowing in the heated hydrocarbon feed line 144. More or less outlets 146 can be used and they can be directed downstream of the flow F. The distributor 134 directly injects the catalyst precursor concentrate stream from line 132 into the heated hydrocarbon feed stream in the heated hydrocarbon feed line 144. The SHC feed line 108 may be in downstream communication with said catalyst precursor reactor 102 at an inlet 146 that is in downstream communication with the heater 112 and in upstream communication with said SHC reactor 114. The catalyst precursor concentrate disperses in the heated hydrocarbon feed stream and becomes the SHC feed stream flowing into the SHC feed line 108. The upstream injection of the catalyst precursor concentrate stream fosters rapid mixing of the catalyst precursor concentrate stream and the heated hydrocarbon feed stream to provide the SHC feed stream. The catalyst precursor concentrate line 132 adjoins the slurry hydrocracking feed line 108 by use of the distributor 134.

EXAMPLES

Example 1

We conducted a batch experiment to assess activity of dried catalyst precursor concentrate directly injected into a heavy hydrocarbon feed comprising the SHC feed for the experiment. Urals VR was used for all the experiments as a testing feed for catalysts activity evaluation. In all but the last experiment, the catalyst was not sulfided before it was dispersed in the heavy hydrocarbon feed. The last catalyst concentrate in the table was not a directly injected catalyst precursor concentrate but a preformed activated MicroCat catalyst which had molybdenum converted to $MoS_2$ before entering the SHC reactor. Conversion and TIOR concentration for the directly injected catalyst precursor were as good as conventional preformed catalyst. Results are shown in the Table.

TABLE

| Synthesis details | Mo in phosphomolybdic acid, % | Conversion to <524° C. (975° F.), % | TIOR, % |
|---|---|---|---|
| Dried Precursor Concentrate of 50/50 vacuum gas oil/Merey 16 Vacuum Resid | 8.3 | 84.3 | 3.0 |
| Dried Precursor Concentrate of 50/50 vacuum gas oil/ Peace River Oil Vacuum Resid | 8.3 | 81.9 | 3.2 |
| Dried Precursor Concentrate of 50/50 vacuum gas oil/Heavy Arab Vacuum Resid | 7.9 | 84.7 | 2.6 |
| Dried Precursor Concentrate of 50/50 clarified slurry oil/ Castilla Vacuum Resid | 8.5 | 84.5 | 2.9 |
| Dried Precursor Concentrate of 50/50 clarified slurry oil/Tahe Atmospheric Resid | 6.9 | 84.6 | 2.6 |
| 50/50 vacuum gas oil/ Heavy Arab Vacuum Resid with MicroCat | 8.5 | 84.9 | 3.4 |

Example 2

We conducted an experiment to determine how quickly molybdenum trioxide converts to molybdenum disulfide, the active form of the catalyst at reactor conditions. We believe that molybdenum trioxide approximates the activity that phosphomolybdic acid would undergo in the SHC reactor because molybdenum oxides would disassociate from the phosphorous under reaction conditions.

Figure 3:
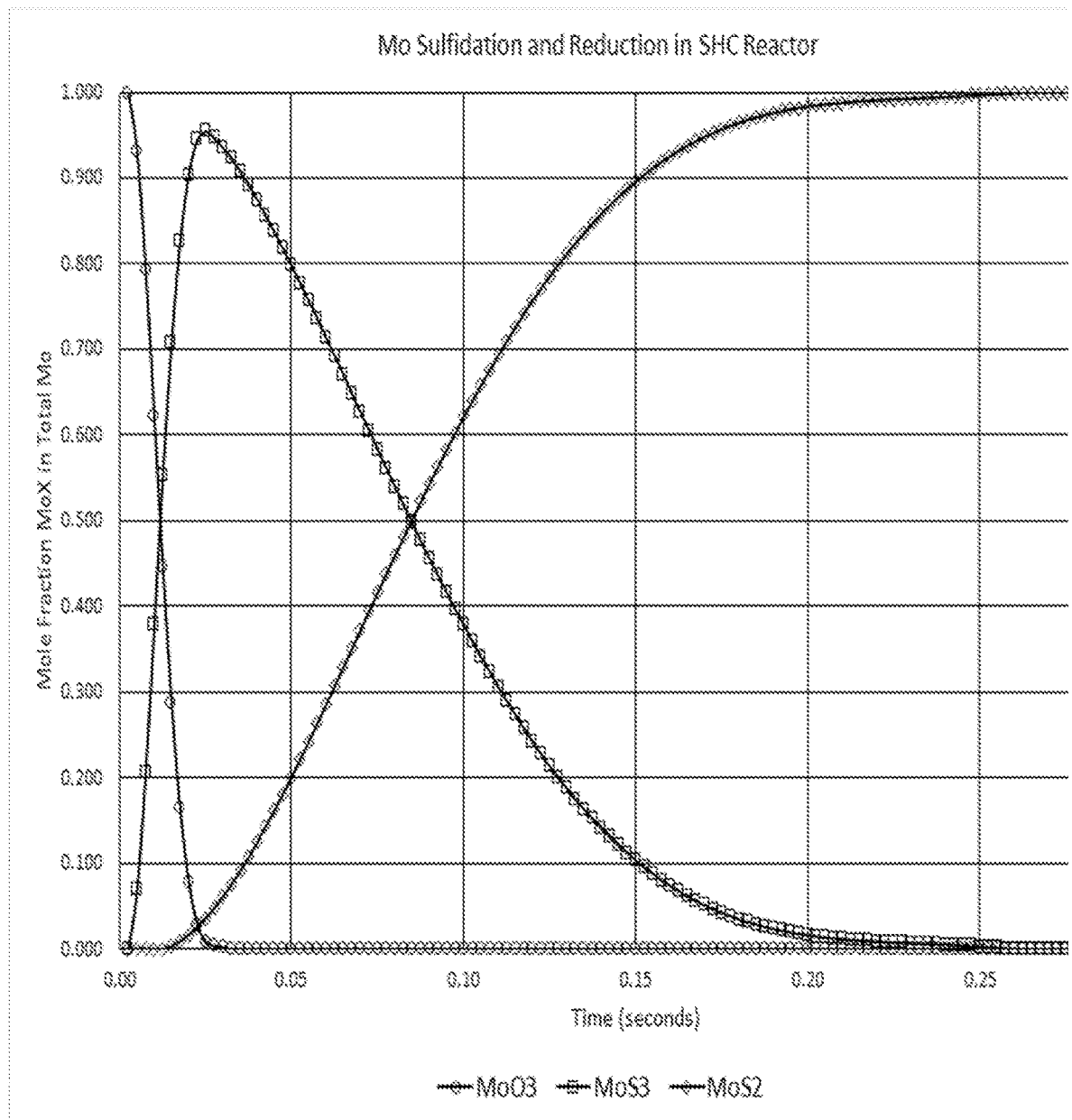
FIG. 3 is a plot of mole fraction of a molybdenum compound to a total molybdenum in the reactor over time for three molybdenum compounds.

FIG. 3 is a plot of mole fraction of the molybdenum compound to total molybdenum in the reactor over time for three molybdenum compounds, $MoO_3$, the initial molybdenum compound; $MoS_3$, the intermediate molybdenum compound and $MoS_2$, the active catalyst. We found at conditions of 454° C. (850° F.), an initial $MoO_3$ concentration of 0.5 mol %, a hydrogen partial pressure of 1650 psi and a hydrogen sulfide partial pressure of 100 psi, that the $MoO_3$ converts to $MOS_2$ within 0.3 seconds. Hence, the need for presulfiding to the active form of the catalyst upstream of the SHC reactor with the attendant risk of fouling is obviated.

Generally, the principles of the present disclosure do not require the catalyst to be pre-sulfided prior to entering the reactor or require the SHC apparatus 100 to comprise pre-sulfiding chemicals, equipment, or systems because the catalyst concentrate stream converts to molybdenum sulfide within 1 second of entry into the SHC reactor. The present disclosure reduces the need for routine cleaning of directly heated fouling catalyst preforming equipment.

Any of the above processes, equipment, lines, units, separators, columns, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof, the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring components, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the disclosure is an apparatus comprising a catalyst precursor reactor for providing a catalyst precursor stream in downstream communication with a source of catalytic metal; a slurry hydrocracking feed line for providing a heavy hydrocarbon feed stream in downstream communication with a heater; and a slurry hydrocracking reactor in downstream communication with the slurry hydrocracking feed line and with the catalyst precursor reactor, said slurry hydrocracking feed line being in communication with said catalyst precursor reactor at an inlet that is downstream of said heater and upstream of said slurry hydrocracking reactor. An embodiment of the disclosure is one, any or all of prior embodiments in this paragraph up through the first embodiment in this paragraph further comprising a precursor concentrate mixer in downstream communication with the catalyst precursor reactor and a heavy hydrocarbon source; the slurry hydrocracking feed line being in downstream communication with the precursor concentrate mixer. An embodiment of the disclosure is one, any or all of prior embodiments in this paragraph up through the first embodiment in this paragraph wherein the catalyst precursor reactor is in downstream communication with a source of water and further comprising a drying section downstream of the precursor concentrate mixer. An embodiment of the disclosure is one, any or all of prior embodiments in this paragraph up through the first embodiment in this paragraph, wherein the metal is molybdenum and the catalyst precursor reactor is in downstream communication with a source of phosphorous. An embodiment of the disclosure is one, any or all of prior embodiments in this paragraph up through the first embodiment in this paragraph wherein the slurry hydrocracking feed line is in downstream communication with a drying section. An embodiment of the disclosure is one, any or all of prior embodiments in this paragraph up through the first embodiment in this paragraph wherein the drying section comprises a water flash column. An embodiment of the disclosure is one, any or all of prior embodiments in this paragraph up through the first embodiment in this paragraph, further comprising a catalyst precursor concentrate line providing a catalyst precursor concentrate stream, the slurry hydrocracking feed line being in downstream communication with the catalyst precursor concentrate line. An embodiment of the disclosure is one, any or all of prior embodiments in this paragraph up through the first embodiment in this paragraph, further comprising a nozzle connecting a catalyst precursor concentrate line to the slurry hydrocracking feed line for injecting a catalyst precursor concentrate stream into the heavy hydrocarbon feed stream.

A second embodiment of the disclosure is an apparatus comprising a catalyst reactor in downstream communication with a source of molybdenum for producing a catalyst precursor stream; a mixing vessel in downstream communication with the catalyst reactor and a source of heavy hydrocarbon for mixing the catalyst precursor stream with a heavy hydrocarbon stream to provide a catalyst precursor concentrate stream; and a drying section in downstream communication with the mixing vessel for drying the catalyst precursor concentrate stream to provide a dried precursor concentrate stream; a slurry hydrocracking section comprising a heater and a slurry hydrocracking reactor; and a dried precursor line in downstream communication with the drying section adjoining the slurry hydrocracking section at a slurry hydrocracking feed line downstream of the heater and upstream of the slurry hydrocracking reactor. An embodiment of the disclosure is one, any or all of prior embodiments in this paragraph up through the second embodiment in this paragraph, further comprising direct injection of a dried precursor concentrate stream into to the slurry hydrocracking section downstream of the heater, wherein a nozzle injects the dried precursor concentrate upstream into a heavy hydrocarbon feed stream in the slurry hydrocracking feed line. An embodiment of the disclosure is one, any or all of prior embodiments in this paragraph up through the second embodiment in this paragraph wherein the slurry hydrocracking feed line is in downstream communication with the drying section.

A third embodiment of the disclosure is a process for slurry hydrocracking, the process comprising preparing a catalyst precursor stream comprising molybdenum in a catalyst precursor reactor; mixing the catalyst precursor stream with a heavy hydrocarbon stream to provide a catalyst precursor concentrate stream; heating a heavy hydrocarbon feed stream in a heater to provide a heated hydrocarbon feed stream; mixing the catalyst precursor concentrate stream with the heated hydrocarbon feed stream to provide a slurry hydrocracking feed stream; and reacting the slurry hydrocracking feed stream in a slurry hydrocracking reactor. An embodiment of the disclosure is one, any or all of prior embodiments in this paragraph up through the third embodiment in this paragraph, further comprising heating the heavy hydrocarbon feed stream to a temperature of no more than 695° F. prior to mixing the catalyst precursor concentrate stream with the heated hydrocarbon feed stream. An embodiment of the disclosure is one, any or all of prior embodiments in this paragraph up through the third embodiment in this paragraph, wherein the slurry hydrocracking reactor is operated at a higher temperature than the temperature of the slurry hydrocracking feed stream. An embodiment of the disclosure is one, any or all of prior embodiments in this paragraph up through the third embodiment in this paragraph, further comprising feeding a heated hydrogen stream to the reactor to heat the reactor to a temperature above the temperature of the slurry hydrocracking feed stream. An embodiment of the disclosure is one, any or all of prior embodiments in this paragraph up through the third embodiment in this paragraph, wherein the temperature of the slurry hydrocracking feed stream is no more than 700° F. An embodiment of the disclosure is one, any or all of prior embodiments in this paragraph up through the third embodiment in this paragraph, wherein the molybdenum is provided in an aqueous solution of a molybdenum compound. An embodiment of the disclosure is one, any or all of prior embodiments in this paragraph up through the third embodiment in this paragraph, further comprising drying the catalyst concentrate stream. An embodiment of the disclosure is one, any or all of prior embodiments in this paragraph up through the third embodiment in this paragraph, wherein the molybdenum in the slurry hydrocracking feed stream from the catalyst precursor concentrate stream converts to molybdenum sulfide within about 1 to about 3 seconds of entry into the reactor. An embodiment of the disclosure is one, any or all of prior embodiments in this paragraph up through the third embodiment in this paragraph, wherein the slurry hydrocracking feed stream comprises less than about 500 to about 2000 wppm of molybdenum.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A slurry hydrocracking apparatus comprising:
a catalyst precursor reactor for providing a catalyst precursor stream in downstream communication with a source of catalytic metal;
a slurry hydrocracking feed line for providing a heavy hydrocarbon feed stream in downstream communication with a heater; and
a slurry hydrocracking reactor in downstream communication with the slurry hydrocracking feed line and with the catalyst precursor reactor, said slurry hydrocracking feed line being in communication with said catalyst precursor reactor at an inlet that is downstream of said heater and upstream of said slurry hydrocracking reactor.

2. The slurry hydrocracking apparatus of claim 1 further comprising:
a precursor concentrate mixer in downstream communication with the catalyst precursor reactor and a heavy hydrocarbon source;
the slurry hydrocracking feed line being in downstream communication with the precursor concentrate mixer.

3. The slurry hydrocracking apparatus of claim 2 wherein said catalyst precursor reactor is in downstream communication with a source of water and further comprising a drying section downstream of said precursor concentrate mixer.

4. The slurry hydrocracking apparatus of claim 2, wherein said metal is a molybdenum and said catalyst precursor reactor is in downstream communication with a source of phosphorous.

5. The slurry hydrocracking apparatus of claim 4 wherein said slurry hydrocracking feed line is in downstream communication with a drying section.

6. The slurry hydrocracking apparatus of claim 5 wherein said drying section comprises a water flash column.

7. The slurry hydrocracking apparatus of claim 2, further comprising a catalyst precursor concentrate line providing a catalyst precursor concentrate stream, said slurry hydrocracking feed line being in downstream communication with said catalyst precursor concentrate line.

8. The slurry hydrocracking apparatus of claim 4, further comprising a nozzle connecting a catalyst precursor concentrate line to the slurry hydrocracking feed line for injecting a catalyst precursor concentrate stream into the heavy hydrocarbon feed stream.

9. A slurry hydrocracking apparatus comprising:
a catalyst reactor in downstream communication with a source of molybdenum for producing a catalyst precursor stream;
a mixing vessel in downstream communication with said catalyst reactor and a source of heavy hydrocarbon for mixing said catalyst precursor stream with a heavy hydrocarbon stream to provide a catalyst precursor concentrate stream; and
a drying section in downstream communication with the mixing vessel for drying the catalyst precursor concentrate stream to provide a dried precursor concentrate stream;
a slurry hydrocracking section comprising a heater and a slurry hydrocracking reactor; and
a dried precursor line in downstream communication with the drying section adjoining the slurry hydrocracking section at a slurry hydrocracking feed line downstream of said heater and upstream of said slurry hydrocracking reactor.

10. The slurry hydrocracking apparatus of claim 9, further comprising direct injection of a dried precursor concentrate stream into to the slurry hydrocracking section downstream of the heater, wherein a nozzle injects the dried precursor concentrate upstream into a heavy hydrocarbon feed stream in the slurry hydrocracking feed line.

11. The slurry hydrocracking apparatus of claim 9 wherein said slurry hydrocracking feed line is in downstream communication with said drying section.

12. A process for slurry hydrocracking, the process comprising:
preparing a catalyst precursor stream comprising molybdenum in a catalyst precursor reactor;
mixing the catalyst precursor stream with a heavy hydrocarbon stream to provide a catalyst precursor concentrate stream;
heating a heavy hydrocarbon feed stream in a heater to provide a heated hydrocarbon feed stream;
mixing the catalyst precursor concentrate stream with the heated hydrocarbon feed stream to provide a slurry hydrocracking feed stream; and
reacting the slurry hydrocracking feed stream in a slurry hydrocracking reactor.

13. The process of claim 12, further comprising heating the heavy hydrocarbon feed stream to a temperature of no more than 695° F. prior to mixing the catalyst precursor concentrate stream with the heated hydrocarbon feed stream.

14. The process of claim 13, wherein the slurry hydrocracking reactor is operated at a higher temperature than the temperature of the slurry hydrocracking feed stream.

15. The process of claim 14, further comprising feeding a heated hydrogen stream to the reactor to heat the reactor to a temperature above the temperature of the slurry hydrocracking feed stream.

16. The process of claim 15, wherein the temperature of the slurry hydrocracking feed stream is no more than 700° F.

17. The process of claim 12, wherein the molybdenum is provided in an aqueous solution of a molybdenum compound.

18. The process of claim 17, further comprising drying the catalyst concentrate stream.

19. The process of claim 18, wherein the molybdenum in the slurry hydrocracking feed stream from the catalyst precursor concentrate stream converts to molybdenum sulfide within about 1 to about 3 seconds of entry into the reactor.

20. The process of claim 12, wherein the slurry hydrocracking feed stream comprises less than about 500 to about 2000 wppm of molybdenum.

* * * * *